(12) United States Patent
Kamentser et al.

(10) Patent No.: US 6,504,703 B1
(45) Date of Patent: Jan. 7, 2003

(54) CAPACITIVE TRANSDUCER APPARATUS AND METHOD OF MANUFACTURE THEREOF FOR COMPUTER DISPLAY USER INTERFACE

(75) Inventors: Boris Kamentser, Fountain Valley, CA (US); Eugenia Kamentser, Garden Grove, CA (US)

(73) Assignee: Bokam Engineering, Santa Ana, CA (US)

( * ) Notice: Subject to any disclaimer, the term of this patent is extended or adjusted under 35 U.S.C. 154(b) by 0 days.

(21) Appl. No.: 08/870,635

(22) Filed: Jun. 6, 1997

(51) Int. Cl.[7] .............................. H01G 5/16; H01G 5/38
(52) U.S. Cl. ..................... 361/290; 361/292; 361/299.2
(58) Field of Search ........................... 361/275.3, 277, 361/278, 280, 281, 283.2, 283.3, 287, 288, 290, 291, 292, 296, 299.1, 298.2; 310/338; 200/600; 307/116, 119, 148

(56) References Cited

U.S. PATENT DOCUMENTS

| | | | |
|---|---|---|---|
| 3,965,399 A | * | 6/1976 | Walker, Jr. et al. .......... 361/288 |
| 4,305,007 A | * | 12/1981 | Hughes ....................... 307/116 |
| 4,336,483 A | * | 6/1982 | Smith .......................... 318/662 |

* cited by examiner

Primary Examiner—Kristine Kincaid
Assistant Examiner—Anthony Dinkins
(74) Attorney, Agent, or Firm—Leonard Tachner

(57) ABSTRACT

A capacitive transducer apparatus converts mechanical force to electrical signal parameters by change of spacing between plates of a plurality of capacitors. The apparatus has two mechanical components. The first component includes an articulating member such as a post surrounded by a first capacitive plate. Means are provided for causing the articulating member to articulate responsive to user manipulation thereof, and thereafter, to return to a quiescent position. The second component includes a second capacitive plate made up of a plurality of printed metalized members disposed about the articulating member substantially parallel to the first capacitive plate. A circuit is provided for detecting respective signals from a plurality of capacitors formed by the plates, the respective signals varying in value depending on articulation of the articulating member which alters the capacitance of the respective capacitors depending on the direction and magnitude of an applied force. The capacitors preferably include flat, electrically conductive members on a planar substrate, such as etched conductive regions on a printed circuit board, and the articulating member includes an electrically conductive member whose varying proximity to the conductive region, due to the manipulation by the user, produces a correspondingly varying capacitance value. The magnitude of the capacitance is determined by a data acquisition system, preferably including RC oscillators and a microcontroller.

14 Claims, 4 Drawing Sheets

CAPACITIVE TRANSDUCER APPARATUS AND METHOD OF MANUFACTURE THEREOF FOR COMPUTER DISPLAY USER INTERFACE

BACKGROUND OF THE INVENTION

1. Field of the Invention

The invention relates generally to the field of computer display user interface systems. More particularly, the invention relates to user apparatus for moving a symbol, such as a cursor, on a display, and for entering "point and click" commands.

2. Prior Art

The growing interactiveness of home entertainment systems, particularly cable television, interactive television, and Internet set-top boxes is placing greater demands on hand-operated controls.

Mice have been commonly used as user-manipulable apparatus. Using a mouse, a user directs the movement of a cursor across a display screen by corresponding manual mouse movements.

Joystick-type devices have also been used. One such joystick-type is a trackpoint device which has been mounted in-keyboard in many laptop computers. A trackpoint device includes a button-like structure resembling a pencil eraser. It is usually disposed between keys of a computer keyboard as a user interface in portable computers. The need for a mouse, and a flat working surface on which the user manipulates the mouse, is eliminated because the user is able to manipulate a trackpoint device entirely within the keyboard.

A conventional physical implementation of a trackpoint pointing device includes strain gauge sensors, and a post serving as a lever arm. By manipulating the post, the user flexes the strain gauges. Small analog signals produced by the strain gauges are interpreted by on-board software, and the cursor is moved accordingly.

The strain gauges produce a ½ percent full-scale signal change, and must be individually trimmed during manufacture to match their outputs. The manufacturing and trimming of the strain gauges, combined with the small analog signal they produce, contribute to the cost of the sensor and of the electronics required to make a trackpoint system. Moreover, the small full-scale magnitude of the signal change places a burden on the data acquisition system which processes the strain gauge signals into cursor movement signals.

Therefore, an important objective in the design and manufacture of trackpoint devices is the reduction of these costly factors.

These issues have been confronted in the design and manufacture of other types of user-manipulable electronic components. For instance, a conventional structure is taught in Hughes, U.S. Pat. No. 4,305,007, "Electronic Two Directional Control Apparatus", issued Dec. 8, 1981. This patent describes a structure including four sensing electrodes, whose capacitances independently vary in response to the proximity of an external object.

The Hughes structure includes sensing electrodes that map out four quadrants. A controlling member at the end of a displaceable member supported from above by a ball joint, moves in relation to the sensing electrodes. These elements are contained within a three dimensional grounded shield box.

Unfortunately, the Hughes device is impractical for implementation in a keyboard or in a portable computer. Moreover, the Hughes structure requires considerable cost for parts and assembly. Also, the manufacturing process must include manual trimming of the electronic circuit to match the outputs of the four quadrants. Therefore, the Hughes apparatus does not provide the desired low cost.

SUMMARY OF THE INVENTION

Accordingly, it is an object of the invention to provide cost reductions in the manufacture of trackpoint user-manipulatable pointing devices.

To achieve this and other objects, there is provided in accordance with the invention an apparatus for sensing manipulation by a user and for producing signals related to the manipulation. The signals produced by such an apparatus may then be used as part of a user interface system. For instance, the signals might be used in a personal computer having a display screen, for causing movement of a displayed symbol, such as a cursor.

The apparatus has two mechanical components. The first component includes an articulating member such as a post surrounded by a first capacitive plate. Means are provided for causing the articulating member to articulate responsive to user manipulation thereof, and thereafter, to return to a quiescent position.

The second component includes a second capacitive plate, made up of a plurality of printed metalized members disposed about the articulating member substantially parallel to the first capacitive plate. Means are provided for detecting respective signals from a plurality of capacitors formed by said plates, the respective signals varying in value depending on articulation of the articulating member which alters the capacitance of the respective capacitors depending on the direction and magnitude of an applied force.

In accordance with the invention, the invention comprises inexpensive electrical components and simple mechanical components, to produce a low cost pointing device whose physical size and dimensions are suited for use in applications such as inkeyboard trackpoint devices.

The capacitors preferably include flat, electrically conductive members on a planar substrate, such as etched conductive regions on a printed circuit board, and the articulating member includes an electrically conductive member whose varying proximity to the conductive region, due to the manipulation by the user, produces a correspondingly varying capacitance value. The magnitude of the capacitance is determined by a data acquisition system, preferably including RC oscillators and a microcontroller. In accordance with suitable signal conditioning, the capacitance value is used to produce the cursor movement signals.

A device according to the invention may advantageously be employed as a pointing device for hand-held remote control applications, as well as for keyboards. Cost is a driving factor in the success of any device targeted to the consumer electronics market. The capacitive sensor and data acquisition system according to the invention (oscillator and microcontroller) provide advantageously low manufacturing costs.

The low-cost capacitive device according to the invention is also inherently less expensive than a mouse. Both pointing technologies require a microcontroller. In addition, a mouse requires two optical interrupters, two mechanical disks, a rotating ball, and a three dimensional structure to align these items. A preferred implementation of the capacitive sensor-based device according to the invention includes a conductive capacitive element attached to the circuit board, and an inexpensive integrated circuit (Schmitt Trigger NAND). The invention uses fewer components, and is easier to manufacture and assemble. The absence of moving parts exposed to the environment means the invention has advantageously low maintenance, and a low failure rate.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DESCRIPTION OF THE PREFERRED EMBODIMENT

The description which follows will generally presume that an apparatus according to the invention will be used in connection with a computer. However, it will be understood that televisions, specialized World Wide Web browsers for use with televisions or other home electronics, and other such electronic devices, may also make advantageous use of the invention.

Figure 1:
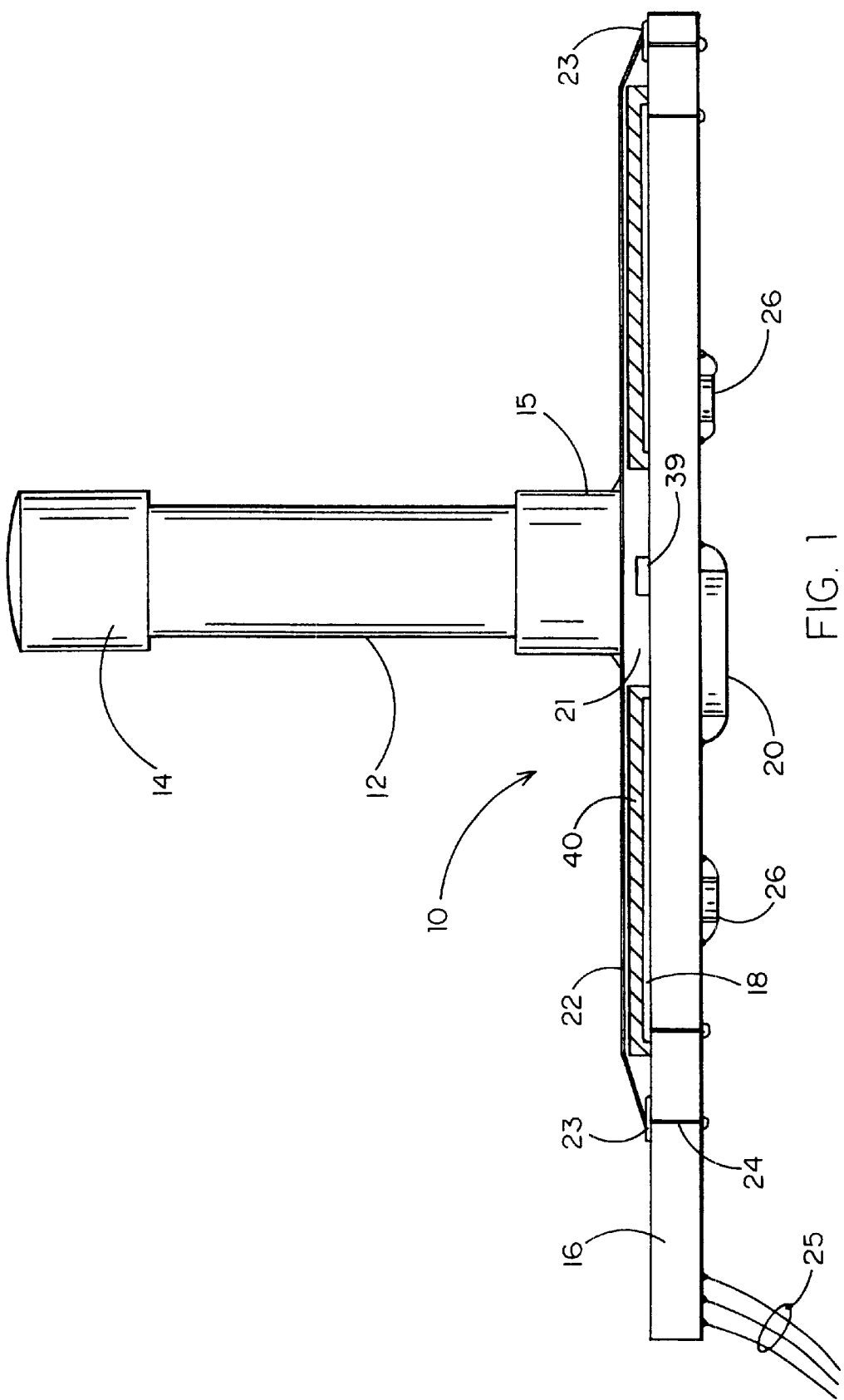
FIG. 1 is a cross-sectional view of the capacitive transducer of the present invention.

Referring to FIG. 1, it will be seen that a capacitive transducer 10 in accordance with the present invention comprises a post 12 having a free end 14 and a base 15. Post 12 extends generally normal to printed circuit board 16 one side of which is provided with printed circuit capacitive elements 18.

Figure 2:
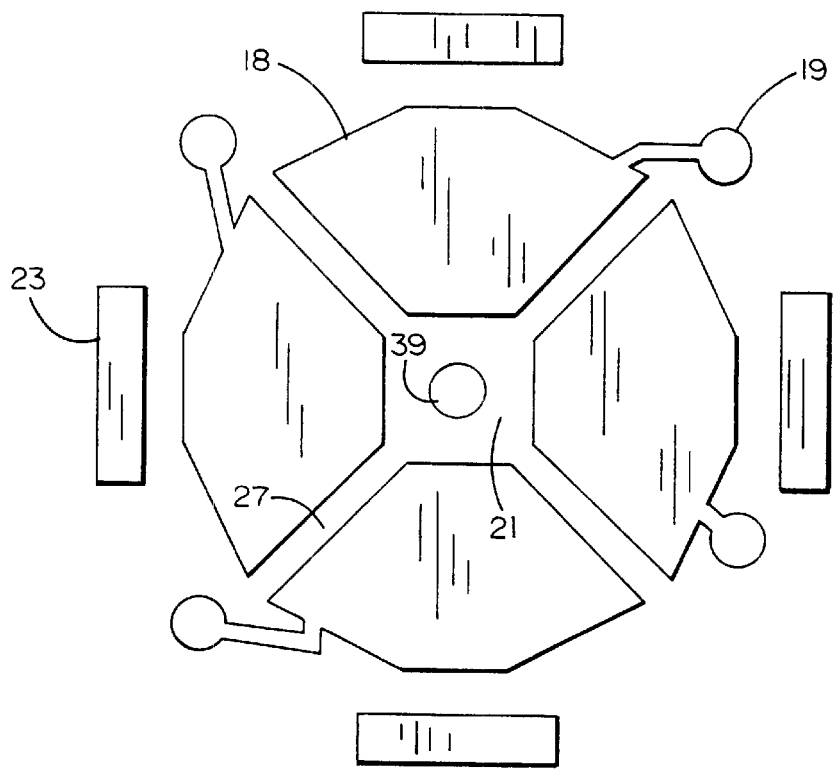
FIG. 2 is a top view of the post-side surface of the printed circuit board of the invention.

As seen in FIG. 2, there are four elements 18 in a symmetrical array, each connected to a terminal 19. Each such element is shaped like a 90 degree piece of pie, but truncated at the center of the element array leaving a generally rectangular area 21 of non-metalized circuit board surface. A non-metalized gap 27 is positioned between respective pie elements 18 so that each is electrical isolated from the others. As also seen in FIG. 2, a plurality of feedthrough metalized rectangles 23 is provided for feeding electrical connections through circuit board 16.

Figure 3:
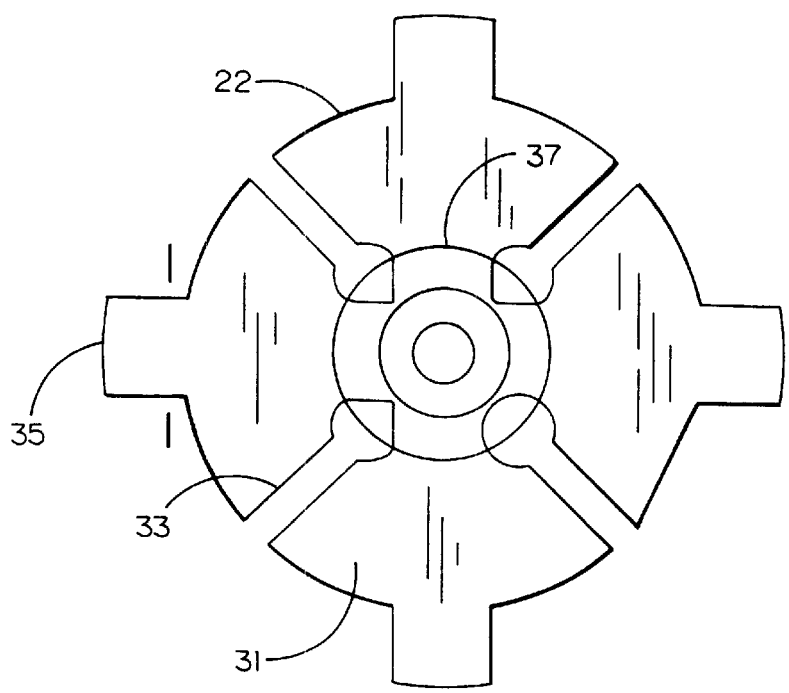
FIG. 3 is a top view of the top capacitor plate.

As also seen in FIG. 1, overlying in spaced relation to capacitive elements 18 is a capacitive plate 22. FIG. 3 illustrates the shape of capacitive plate 22. It will be seen that plate 22 is also divided into four symmetrical quadrants 31 partially separated by gaps 33. At the outer perimeter of each quadrant 31 there is a solder tap 35 for connection to a metalized rectangle 23 as shown in FIG. 1. At the center of plate 22 there is a flat circular region 37. The base 15 of post 12 is soldered or otherwise firmly attached to the plate 22 at circular region 37. In operation, the quadrants 31 and elements 18 form four separate capacitors. The capacitance of each such capacitor varies with spacing between quadrants 31 and elements 18, which is subject to change by forces applied to post 12 which tilts, thereby increasing at least one capacitance while decreasing another in the opposed quadrant.

Figure 4:
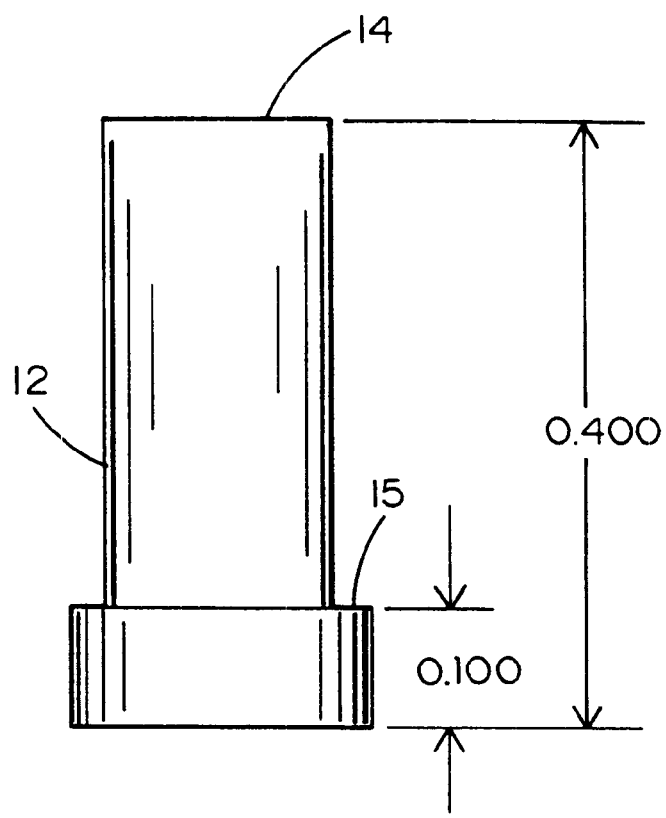
FIG. 4 is a side view of the post.
Figure 5:
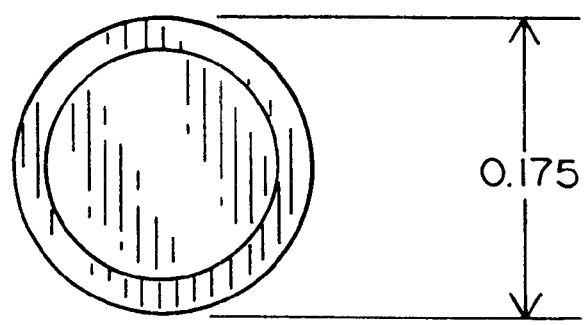
FIG. 5 is a bottom view of the post.

The preferred dimensions of post 12 are shown in FIGS. 4 and 5. Of course, it will be understood that the dimensions are merely illustrative of a preferred embodiment and that they may be readily altered to accommodate any application requiring the conversion of mechanical force to electrical parameters.

Figure 6:
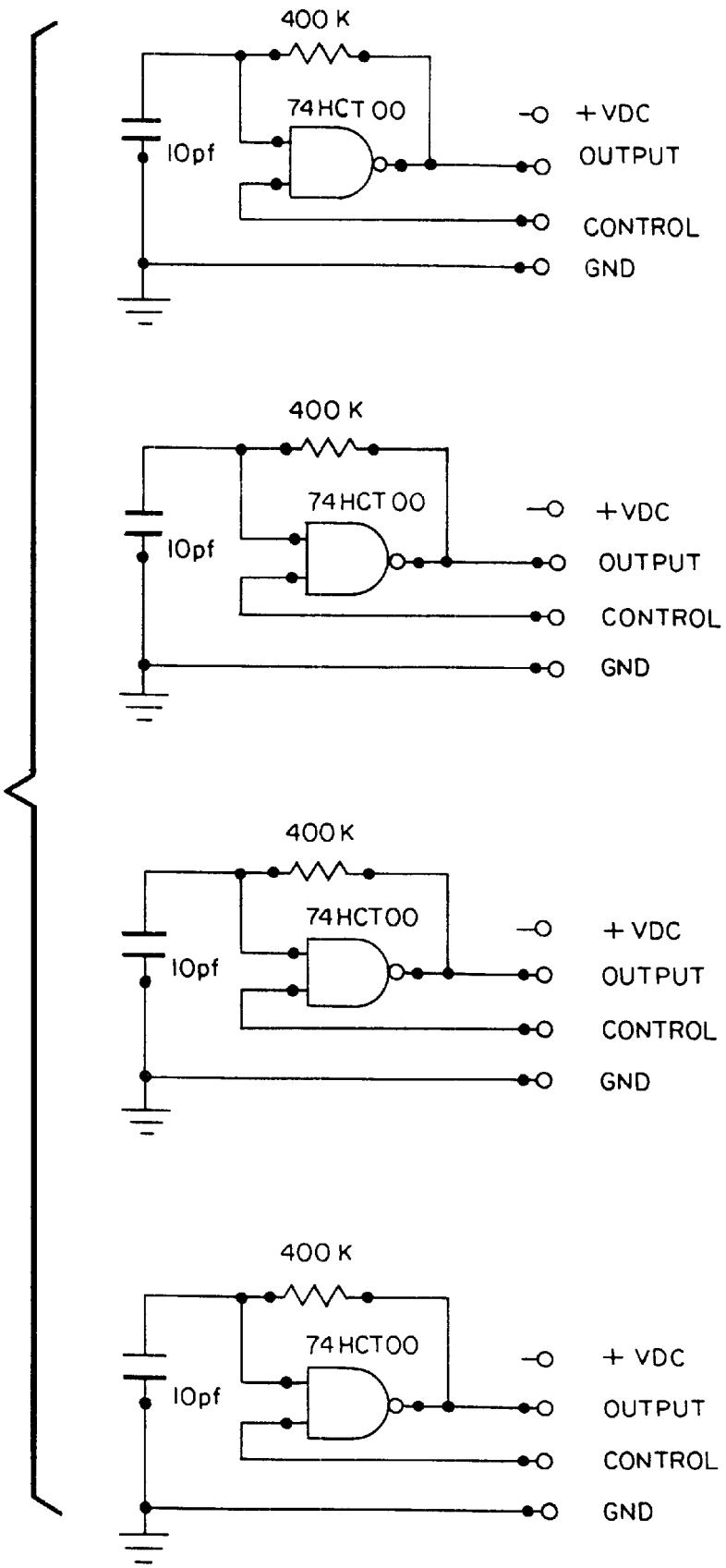
FIG. 6 is a schematic diagram of the capacitor/resistor oscillators of the invention.

A circuit for converting the four capacitances of the transducer 10, is shown in FIG. 6. As seen therein, each capacitor of the transducer is connected as an input to a corresponding Schmitt trigger NAND gate across which is connected a feedback resistor. The resulting oscillator has a frequency of oscillation dependent upon the value of the input capacitor. Movement of post 12 causes changes in capacitance and oscillation frequency of the respective oscillators, depending on the direction and magnitude of the force on post 12.

Immediately below the base 15 of post 12 is a feed through terminal 39. A force directed longitudinally through the axis of post 12 will close the gap between the base 15 and terminal 39 thereby connecting all of the quadrants simultaneously to terminal 39. Such a momentary depression of post 12 may be used as a switch operation to initiate a "click" action for cursor control or other such manual operation typically associated with "point and click" manual user interface devices used with computer displays.

In order to prevent electrical short circuit between the opposed plates of the respective capacitors, the preferred embodiment also provides a dielectric layer 40 between quadrants 31 and elements 18 as seen in FIG. 1. Layer 40 may be made of Mylar, Upilex, Kapton, solder mask dielectric, or other material in a thickness of about 1 to 2 mils.

In an alternative embodiment of the invention, a ceramic substrate is substituted for the printed circuit board 16. Such a substitution simplifies fabrication of the invention by making it possible to screen print the resistors to generate a selected nominal oscillation frequency despite significant variation in the nominal value of the capacitors. Accordingly, the invention herein includes the novel steps of a method of fabricating the apparatus disclosed herein and including the step of laser trimming the resistors of FIG. 6 which reside as screen printed resistors on the surface of a ceramic substrate.

Having thus disclosed preferred embodiments of the best mode presently contemplated, it being understood that the described embodiments are merely illustrative and not necessarily limiting of the scope of protection afforded hereby, what is claimed is:

1. A capacitive transducer apparatus for converting mechanical force applied to an elongated member to corresponding electrical signals having at least one parameter dependent upon the direction and magnitude of the applied force; the apparatus comprising:

a pair of spaced, substantially parallel, conductive planar surfaces, a first one of said surfaces being fixed irrespective of the force applied to said elongated member, a second one of said surfaces being mechanically affixed to said elongated member and being responsive to movement of said elongated member for altering at least the spacing relative to the first one of said surfaces thereby changing the capacitance formed by said surfaces;

means connected to said first and second surfaces for converting said capacitance to said corresponding electrical signals.

2. The apparatus recited in claim 1 wherein each said surface comprises a plurality of distinct elements, each of said elements of said first surface cooperating with a corresponding one of said elements of said second surface to form a plurality of distinct variable capacitors; and wherein said means for converting comprises means associated with each of said variable capacitors for converting each of said capacitors to a distinct electrical signal.

3. The apparatus recited in claim 2 wherein each of said surfaces comprises four substantially symmetrical quadrants forming said distinct elements.

4. The apparatus recited in claim 3 wherein said means for converting comprises a separate oscillator for each of said four quadrants, the frequency of oscillation of each said oscillator being a function of the spacing between respective opposed quadrants of said first and second surfaces.

5. The apparatus recited in claim 1 wherein said at least one parameter is frequency of oscillation and wherein said means for converting comprises at least one oscillator, the oscillator frequency of which is dependent upon said spacing.

6. The apparatus recited in claim 5 wherein said at least one oscillator comprises a variable resistor.

7. The apparatus recited in claim 5 wherein said at least one oscillator comprises a laser-trimmed resistor.

8. The apparatus recited in claim 1 wherein said elongated member comprises a post extending substantially perpendicular to said surfaces in the absence of the applied force.

9. The apparatus recited in claim 8 further comprising a printed circuit board, said first surface being a metalized plate printed on said board; said second surface being a metalized plate substantially suspended above said first surface; said post being affixed to said second surface at substantially the center thereof, the apparatus further comprising a dielectric material positioned between said first and second surfaces.

10. The apparatus recited in claim 8 wherein each of said surfaces comprises four substantially symmetrical quadrants forming said plurality of distinct elements.

11. The apparatus recited in claim 10 further comprising a printed circuit board, said first surface being a metalized plated printed on said board; said second surface being a metalized plate substantially suspended above said first surface; said post being affixed to said second surface at substantially the center of said four quadrants.

12. The apparatus recited in claim 11 further comprising an aperture at said center of said four quadrants beneath said post and a terminal on said printed circuit board below said post permitting selective depression of said post for connecting said second surface to said terminal.

13. The apparatus recited in claim 1 further comprising a ceramic substrate, said first surface being a metalized layer printed on said substrate.

14. A method of fabricating a force transducer for converting applied mechanical force to a frequency of oscillation; the method comprising the following steps:

a) providing a ceramic substrate;

b) metalizing a selected shape on one surface of said substrate;

c) suspending a metal plate in substantially parallel spaced relation to said metalized shape;

d) affixing a post perpendicularly to said plate for tilting said plate upon articulation of said post;

e) electrically connecting said selected shape and said metal plate as a capacitive input to an oscillator circuit;

f) providing said oscillator circuit on a second surface of said substrate, said oscillator circuit including a screen printed resistor and a Schmitt trigger device; and g) laser trimming said resistor until a desired frequency of oscillation of said oscillator circuit is achieved.

* * * * *